United States Patent Office 3,405,207
Patented Oct. 8, 1968

3,405,207
CYCLIC HIGH-PRESSURE HOT-PRESSING
OF OXIDES
Fred W. Vahldiek, 5851 Barrett Drive, Dayton, Ohio
45431, and Charles T. Lynch, 387 Cherrywood Drive,
Fairborn, Ohio 45324
No Drawing. Filed July 20, 1965, Ser. No. 473,536
3 Claims. (Cl. 264—120)

ABSTRACT OF THE DISCLOSURE

Process of heating and pressing fine grained refractory oxide powders under cycled pressure and temperature conditions ranging from room temperature to 1700° C. and pressures from atmosphere to 30,000 atmospheres with controlled heating and cooling rates resulting in a high-density product in excess of 99% theoretical.

The invention described herein may be manufactured and used by or for the United States Government for governmental purposes without the payment to us of any royalty thereon.

This invention relates to a process for the cyclic high-pressure, hot-pressing of selected oxides and to the product so made.

The problem of making fine grain, refractory inorganic, nonmetallic materials as high-purity, high-density bodies with uniform microstructures, great strength, and improved thermal shock resistance for dependable use under extreme conditions is of considerable importance to the Air Force. Of particular importance is the processing of both stabilized and unstabilized zirconium and hafnium oxides and their conversion into bodies of controlled properties having refractory characteristics for dependable use in extreme environments for heat protecting structural and electronic insulating surfaces.

The objects of the present invention are the production of high-purity, high-density, inorganic oxides with uniform, small grain microstructures by a cyclic, high-pressure, hot-pressing technique. The word "cyclic" means recurrent definite periods or a series of changes leading back to a starting point.

Fine particle refractory oxides, such typically as zirconium oxide ($ZrO_2$), and hafnium oxide ($HfO_2$) form the charge. The zirconia and hafnia may be stabilized with $Y_2O_3$, $Dy_2O_3$, $Yb_2O_3$, and CaO, or not, as preferred, in the practice of the present invention. The oxides are subjected repeatedly to pressures of from 3,800–30,000 atmospheres, and to temperatures from ambient or laboratory temperatures of about 22° C. to about 1700° C. in a cell or press capable of developing high pressures and temperatures.

The press provides preferably for variable controlled heating rates, isothermal operation, measurement of temperatures under pressure, and minimal specimen contamination. Submicron refractory oxides are formed in the hard, dense, high-purity bodies that result from the process, with uniform grain shapes and of from one through ten microns average grain sizes.

The cycling of the material between lower and higher pressures is done typically by applying a pressure such as 3,800 atmospheres, heating the sample slowly from ambient or laboratory temperature to a temperature such as 1700° C., holding the sample at 1700° C. for an hour or longer, decreasing the temperature slowly to ambient, increasing the pressure to 10,000 atmospheres, and then increasing the temperature to 1700° C., at which temperature the sample is held for one hour or longer, and repeating the cycling between 22° C. and 1700° C. at successively higher pressures up to 30,000 atmospheres, and finally decreasing the temperature to ambient and the pressure to atmospheric slowly. The process produces a high strength ceramic body with improved thermal shock resistance and with very uniform grain structure throughout the body.

The novel process of the present invention can be carried out in any press which provides high compacting (or compressing) and heating. Such presses are known to have coacting pressure members and means for applying heat thereto. Representative of such a press, although not limited thereto, is that shown in the U.S. patents to Bundy (2,947,611 and 3,107,395); to Hall (2,947,608; 2,947,610; and 2,941,258) and to Wentorf, Jr. (2,996,-763), which are specifically directed to the so-called "belt" type high temperature and high temperature press. As is well known in the art, thermocouples are employed to insure accurate control of the temperature in the press. Where a "belt" type press is used, resistance heating is effected by means of a high-amperage, low-voltage power supply. By way of example, a 4 kva. unit applying a maximum of 1,000 amperes at 4 volts is adequate for heating the sample up to 1700° C., or even higher. The temperature measurements illustratively are taken with a calibrated Leeds and Northrop potentiometer with results considered adequate to ±10° C. The "belt" type press is calibrated for pressure at room temperature using 0.025 inch of bismuth, 0.025 inch of thallium, and 0.025 inch of barium wires of purity of 99.999%. (Ref. Progress in Very High Pressure Research, 1961, John Wiley & Sons, Inc., page 304.)

In representative laboratory runs, submicron powders of hafnium oxide ($HfO_2$) and zirconium oxide ($ZrO_2$) with average particle size of less than 0.3 micron, and purities of 99.9% were pelleted at 1,000 atmospheres pressure into cylinders and were prefired in air at 1300° C. for two hours to obtain partially sintered preforms or compacts which were then subjected to cyclic high pressure and high temperature conditions within an appropriate press as explained more fully below.

In a typical run, pressure was applied at room temperature to 3,800 atmospheres and then the temperature was increased slowly to 1700° C. The sample was held under these conditions for one hour and then the temperature was decreased to room temperature of from about 20–25° C. and the pressure was increased to 10,-000 atmospheres. The temperature was again increased slowly up to 1700° C. and the sample was held under those conditions for an hour.

This cyclic high pressure technique, where desired, may be continued at higher pressures or ended when the temperature is slowly decreased back to room temperature and the pressure is decreased back to atmospheric. For further cycling, the pressure is increased from 10,000 to 20,000 atmospheres and the temperature is raised to 1700° C. under which condition the sample is held for one hour and then the temperature is lowered to room temperature.

In the next cycling, the pressure is increased to 30,000 atmospheres and the temperature is increased to 1700° C. under which conditions the sample is held for one hour, following which the temperature is decreased slowly to room temperature and the pressure is released to one atmosphere. This completes a cyclic run at 3,800, 10,000, 20,000 and 30,000 atmospheres.

The rates of increasing temperature and pressure employed are 120° C. per minute and 2,000 atmospheres per minute, respectively. The rates of cooling and releasing pressure employed are less than 40° C. per minute and less than 1,000 atmospheres pressure per minute. It is important that the final step at the end of the cyclic technique does not exceed these releases rates or else the specimen will tend to laminate or to crack. Holding times under each pressure and temperature of an hour or a longer duration are required for obtaining uniform temperatures and maximum final densities. In the following Table I the results of cyclic hot pressing at several pressures and temperatures are shown for zirconia and hafnia.

In Table I cyclic high pressure results are presented. The impurity pickup is predominantly boron in illustrative amounts of 1,000 parts per million and aluminum in an amount of 300 parts per million and silicon in the amount of 200 parts per million and iron in the amount of 100 parts per million, that are transferred from the lava and boron nitride insulations into the samples. There is no pickup from the graphite heater. The platinum pickup is less than 50 parts per million and for a six-hour run the total pickup is less than 2,000 parts per million or 0.2% by weight of the finished sample. The total pickup for a two-hour run was less than 1,000 parts per million or 0.1% by weight of the sample. If contamination of specimens is not critical, the specimens need not be encapsulated in platinum; the product then having slightly increased contamination from the adjacent boron nitride sleeve.

TABLE I

| Compound | Pressure (atmos./1,000) | Max. temp. (° C.) | Density (percent theoretical) | Grain size (microns) |
|---|---|---|---|---|
| $ZrO_2$ | 3.8, 10, 20, 30 | 1,700 | 99.8+ | 10–12 (outer). 4–6 (inner). |
| $HfO_2$ | 3.8, 10 | 1,700 | 99.8+ | 6–10 (outer). 3–4 (inner). |
| $ZrO_2$ | 3.8, 10 | 1,300 | 90+ | 2 (outer). <1 (inner). |
| $ZrO_2$ | 3.8, 10 | 1,700 | 99–100 | 10 (outer). 4 (inner). |

At 1700° C. experimental samples have been made in conformity with the teachings of this invention. The samples had densities that were 99.8–100% of the theoretical density for the sample compositions. The samples displayed average grain sizes that varied from the inner ring of about 2 mm. diameter for a center of an approximately 6 mm. diameter specimen as compared with the outer ring of the same specimen. This ring effect displays a pressure gradient in the specimen. The overall grain size, particularly in the center of the specimen, is very small for such high densities. The obtaining of theoretical density with the uniform and relatively small, such as from 1–10 micron, grain size, is considered to be a major benefit of this invention in the making of high-strength ceramic bodies characterized by improved thermal stability. Grain growth is limited even more at the expense of high density by lowering the maximum temperatures and to some extent by lower pressures than the maximum pressures disclosed herein. In this manner, variations in the resultant densities and grain sizes in specimens are accomplished.

An important result of the cyclic high-pressure, hot-pressing technique that is disclosed herein, is the smooth, spherically shaped, grain structures in the samples. The fine grain microstructure is characterized by smooth, rounded, grain boundaries and noticeable regularities in both particle size and particle shape. Electron micrographs at 7,000 diameters of hafnia that had been cycled at 3,800 and 10,000 atmospheres at a temperature of 1700° C. on being surface etched with hydrofluoric acid and a carbon replica made displayed these described characteristics. An electron micrograph with a magnification of 6,400 diameters of zirconia, cycled at pressures of 3,800, 10,000, 20,000 and 30,000 atmospheres up to the temperature of 1700° C., and etched with hydrofluoric acid and a carbon replica made, demonstrated similar characteristics.

The specimens made under cyclic high-pressure, hot-pressing by the described method are semiglossy white in appearance, very smooth, hard and shock resistant. The pure oxides, zirconia and hafnia, are both monoclinic and retain stability on heating through the monoclinic-tetragonal transition temperature range of 1200° C. with zirconia and 1600° C. with hafnia as distinct from unstabilized zirconia and hafnia bodies prepared by conventional sintering techniques. Where the zirconia and hafnia have been stabilized by the use of calcia and yttria as stabilizing oxides, the specimens are hard, white, dense and possessed a uniform fine-grained microstructure.

Oxides other than hafnia and zirconia to which this method of cyclic high-pressure and hot-pressing is applicable, and other refractory inorganic nonmetallic materials, from which it is desired to form high-density, fine-grained objects, are the oxides titania, silica, alumina and magnesia. Products of comparable high quality with the desirable physical characteristics previously described are produced by corresponding cyclic high-pressure, hot-pressing techniques from the borides: titanium diboride, hafnium diboride, zirconium diboride, and tantalum diboride. Carbides to which the herein described process is applicable are: titanium carbide, hafnium carbide, zirconium carbide, tantalum carbide, boron carbide, and silicon carbide. Nitrides to which the present invention applies are: titanium nitride, hafnium nitride, zirconium nitride, tantalum nitride, boron nitride and aluminum nitride. The herein described method is applicable to the silicides: molybdenum silicide, tungsten silicide, zirconium silicide and hafnium silicide.

We claim:
1. A method of making a fine grained dense ceramic body having a density of at least 99 percent theroretical comprising the steps of,
   (a) forming a pellet, which is composed of submicron grains of metallic oxide powder selected from the group consisting of $HfO_2$ and $ZrO_2$ having an average size of less than 0.3 micron, by subjecting said powder to a compacting pressure of 1000 atmospheres and a temperature of 1300° C. for a period of two hours,
   (b) cooling the formed pellet to room temperature,
   (c) applying a pressure of about 3,800 atmospheres to said pellet at the rate of 2,000 atmospheres per minute while raising the temperature of said pellet to 1700° C. at about 120° C. per minute,
   (d) maintaining the pellet under the pressure of about 3,800 atmospheres and at the temperature of 1700° C. for at least 1 hour.
   (e) cooling the pellet to room temperature at a rate less than 40° C. per minute while maintaining the pellet under the pressure of 3,800 atmospheres,
   (f) increasing the pressure to 10,000 atmospheres on said pellet at the rate of 2000 atmospheres per minute while raising the temperature of said pellet to 1700° C. at about 120° C. per minute,
   (g) maintaining the pellet under pressure of 10,000 atmospheres at the rate of 2000 atmospheres per minute and a temperature of 1700° C. for at least 1 hour,
   (h) cooling the pellet to room temperature at a rate less than 40° C. per minute while maintaining a pellet under a pressure of 10,000 atmospheres,
   (i) increasing the pressure to 20,000 atmospheres at the rate of 2,000 atmospheres per minute on said less than 40° C. per minute while maintaining a pellet while slowly raising the temperature of said pellet to 1700° C. at about 120° C. per minute,
   (j) maintaining the pellet under a pressure of 20,000 atmospheres and a temperature of 1700° C. for at least 1 hour,
   (k) cooling the pellet to room temperature at a rate less than 40° C. per minute while maintaining the pellet under a pressure of 20,000 atmospheres,
   (l) increasing the pressure to 30,000 atmospheres on said pellet while slowly raising the temperature of said pellet to 1700° C. at about 120° C. per minute,

(m) maintaining the pellet under a pressure of 30,000 atmospheres and a temperature of 1700° C. for at least 1 hour, and thereafter (n) cooling the pellet to room temperature at a rate less than 40° C. per minute while reducing the pressure on said pellet to atmospheric pressure at about 1000 atmospheres per minute.

2. The method of claim 1 in which the metallic oxide powder is $HfO_2$.

3. The method of claim 1 in which the metallic oxide powder is $ZrO_2$.

References Cited

UNITED STATES PATENTS

| | | | |
|---|---|---|---|
| 2,990,602 | 7/1961 | Brandmayr et al. | 264—125 |
| 3,141,782 | 7/1964 | Livey et al. | 264—125 |
| 3,264,388 | 8/1966 | Roach | 264—125 |
| 1,007,832 | 11/1911 | Whitney | 264—120 |
| 1,071,488 | 8/1913 | Weintraub et al. | 264—125 |
| 2,941,248 | 6/1960 | Hall. | |

ROBERT F. WHITE, *Primary Examiner.*

J. R. HALL, *Assistant Examiner.*